United States Patent
Marroche

(10) Patent No.: US 9,944,542 B2
(45) Date of Patent: Apr. 17, 2018

(54) WATER GENERATION PROCESS IN SUPERCRITICAL STATE WITH LOWER ENERGY CONSUMPTION THROUGH ULTRASOUND

(71) Applicant: MOOMI SOLUCOES AMBIENTAIS S.A., Sales Oliveira (BR)

(72) Inventor: Ruben Garcia Marroche, Montevideo (UY)

(73) Assignee: MOOMI SOLUCOES AMBIENTAIS S.A., Sales Oliveira, SP (BR)

( * ) Notice: Subject to any disclaimer, the term of this patent is extended or adjusted under 35 U.S.C. 154(b) by 1 day.

(21) Appl. No.: 14/299,514

(22) Filed: Jun. 9, 2014

(65) Prior Publication Data

US 2014/0367343 A1 Dec. 18, 2014

(30) Foreign Application Priority Data

Jun. 12, 2013 (BR) .................... 10 2013 014620

(51) Int. Cl.
 C02F 1/36 (2006.01)
 C02F 1/78 (2006.01)
(52) U.S. Cl.
 CPC ............ *C02F 1/36* (2013.01); *C02F 1/78* (2013.01); *C02F 2301/066* (2013.01)

(58) Field of Classification Search
 CPC .......... C02F 1/36; C02F 1/78; A61K 41/0014; B01J 19/10; C12M 47/02
 See application file for complete search history.

(56) References Cited

U.S. PATENT DOCUMENTS

| 6,736,979 B2 * | 5/2004 | de Meulenaer .... A61K 41/0014 128/898 |
| 2009/0090675 A1 * | 4/2009 | Marroche ................. C02F 1/36 210/746 |

* cited by examiner

*Primary Examiner* — Walter D. Griffin
*Assistant Examiner* — Cameron J Allen
(74) *Attorney, Agent, or Firm* — Ladas & Parry LLP

(57) ABSTRACT

WATER GENERATION PROCESS IN SUPERCRITICAL STATE WITH LOWER ENERGY CONSUMPTION THROUGH ULTRASOUND composed by the formation of cavitation bubbles using ultrasound transducers to generate a mechanical pressure. These bubbles will grow up until reaching a size where they collapse. In conventional methods these bubbles collapse randomly, generating effects in a punctual form. In this new process the frequency applied to the fluid varies within a specific range, causing the bubbles to change its size instead of collapsing, delaying the process and allowing for new bubbles to be created. In this way the fluid will have more bubbles than in the conventional form. Another condition required to generate a layer of supercritical water is the uniform collapse of the bubbles. This is made by interposing an equal sign of average frequency making the bubbles to reach a size in which they will collapse all together.

3 Claims, 2 Drawing Sheets

WATER GENERATION PROCESS IN SUPERCRITICAL STATE WITH LOWER ENERGY CONSUMPTION THROUGH ULTRASOUND

FIELD OF THE INVENTION

This application of patent privilege consists in a water generation process in supercritical state through ultrasonic waves with higher energy efficiency and quality for different types of organic and inorganic industrial treatments. This process is intended to separate the products existing in the water and that may meet several embodiments, such as urban sewage treatment, industrial effluents treatment, stillage concentration, demineralization, sulphate separation, among others.

The oxidation with supercritical water consists of generating a highly efficient oxidative system, able to degrade several elements under the generation of a supercritical fluid where critical temperature and pressure are reached. The process consists of mixing residual water and air in supercritical conditions, in order to generate a unique phase where the oxygen penetrates in small pores and is able to oxidize any substance.

STATE OF THE ART

A supercritical fluid is any substance at a temperature and pressure above its critical point, where distinct liquid and gas phases do not exist. It can effuse through solids like a gas, and dissolve materials like a liquid. In addition, close to the critical point, small changes in pressure or temperature result in large changes in density. Water is one of the most commonly used supercritical fluids, achieving its critical point at a temperature of 374° C. and pressure of 221 bar.

According to the sonochemistry principles, when the ultrasound waves act on a liquid, millions of small bubbles are generated in its interior, in which pressure and temperature changes are produced. Thus, the temperature of these bubbles edges may reach thousands of Celsius degrees. The few milliseconds of these bubbles life are enough to produce multiple chemical reactions in its interior and may radically change the liquid chemical structure.

It is confirmed that these ultrasounds also have an effect on solid materials, especially in metals as copper, although these effects are much less notorious than in the liquids and, in general, are not perceived by naked eye.

Problems to be Solved

For the supercritical water production in the conventional form, as previously described, the fluid in its entirety needs to be submitted to a high pressure and high temperature, which implies in a great energy expenditure.

That's why this system, in spite of being so effective in several effluent treatments and chemical reactions, as well as in demineralization, is not used in large scales.

Proposed Solution

The proposed solution is the use of ozone and ultrasound in a way never used before, proposing a higher durability of the bubble generated by the cavitation phenomenon, thus generating a higher quantity of bubbles in the middle and uniformly blowing them practically at the same time.

DESCRIPTION OF THE DRAWINGS

The water generation process in a supercritical state with lower energy consumption will be better seen according to the attached schemes where.

DETAILED DESCRIPTION

Figure 1:
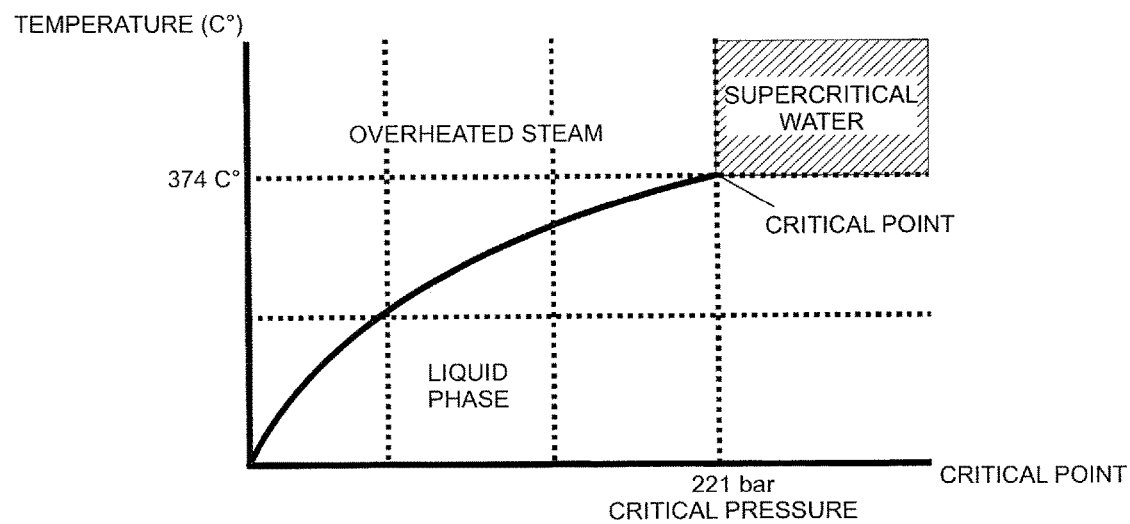
FIG. 1 is a graphic that shows the critical point with temperature of 374° C. and critical pressure of 221 bar.
Figure 2:
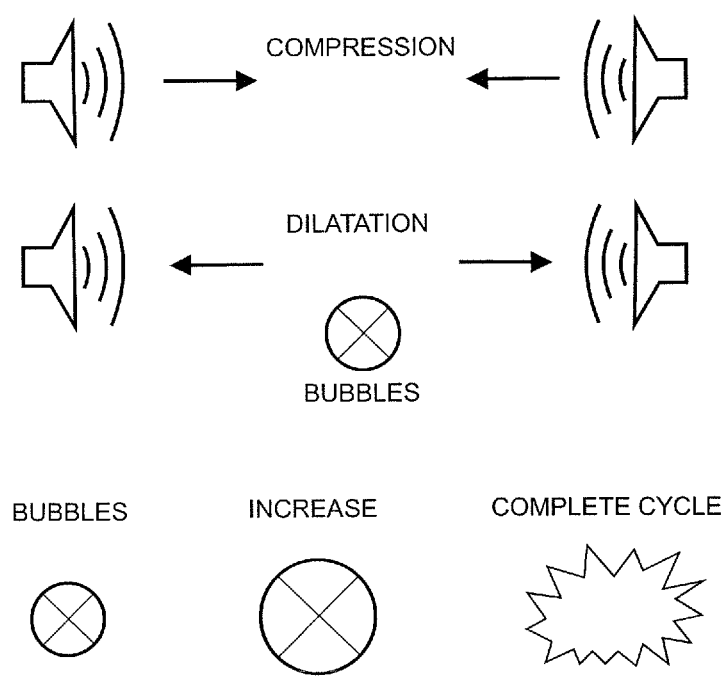
FIG. 2 represents the ultrasound system action cycle on the liquid showing the compression, dilation of the bubble and complete cycle.

The method is composed of the formation of a bubble in the cavitation cycle where two transducers are used in two ends and comprise that the same generates on the fluid a mechanical pressure. This pressure wave on the fluid generates expansion, where we can denominate high and low pressure zones, forming the evaporation generating a bubble. This bubble starts growing until reaches a size ion which the resonance coincides with the vibration that is being applied up to it blows. The process consists of causing the delay of the bubble blown, this will conserving it and also new bubbles will be created with which the fluid will have mores bubbles than conventionally. To achieve this, what is made is to vary the application frequency to the fluid ranging 20% on average. With that, instead of blowing the bubble will explode and in turn, new bubbles will be added to the fluid. Other necessary condition to generate a supercritical water phenomenon in fluid is the even bubbles blow, since the conventional method blow randomly generating the principles previously mentioned in timely manner. Once past about three seconds of bubbles generation, interposing an equal sign, however of average frequency in the variation given with which the bubbles will reach a size that will blown all the bubbles together generating the e supercritical water phenomenon. This creates the amount of times until reaches between 12 and 15 minutes of submitting the same case of fluid at a pressure and temperature greater than or equal to supercritical water. Since the blown is done in 1 second, we need to submit the fluid between 700 and 800 times to blown the bubbles.

To form a bubble in the cavitation cycle two transducers in both ends are used and comprise that the same generates on the fluid a mechanical pressure. This pressure wave on the fluid generates expansion, where we can denominate high and low pressure zones, forming the evaporation generating a bubble. This bubble starts growing until reaches a size ion which the resonance coincides with the vibration that is being applied up to it blows.

The present purpose is based wherein the bubble delay its collapse, this will result in its conservation and also create new bubbles to which the fluid will have more bubbles than the conventional manner. To achieve this, what is done is to vary the frequency of application to fluid ranging 20% on average. With that, instead of blowing the bubble will explode and in turn, new bubbles will be added to the fluid. The bubble size depends on the applied frequency, the higher frequency smaller size.

Another necessary condition to generate a supercritical water phenomenon in fluid is the even bubbles blow, since the conventional method blow randomly generating the principles previously mentioned in timely manner. Once past about three seconds of bubbles generation, interposing an equal sign, however of average frequency in the variation given with which the bubbles will reach a size that will blown all the bubbles together generating the e supercritical water phenomenon. This creates the amount of times until reaches between 12 and 15 minutes of submitting the same case of fluid at a pressure and temperature greater than or equal to supercritical water. Since the blown is done in 1 second, we need to submit the fluid between 700 and 800 times to blown the bubbles.

The process can be summarized as follows:

1. Two transducers are used in mutually opposite sides, so the ultrasound waves generate a mechanical pressure on the fluid,
2. The pressure wave generates dilatation, wherein we may call as low and high-pressure zones, which forms the evaporation and generates a bubble.
3. The bubble starts growing up until reaching a size in which the fluid resonance coincides with the ultrasound vibration that is being applied.
4. The process control induces the delay of bubble collapse, so the bubble will be kept while new bubbles are created, with which the fluid will have more bubbles than the conventional form. To have this effect, what is made is to vary the ultrasound frequency applied to the fluid at an average range of 20%. With that procedure the bubble instead of collapsing it will change its size while new bubbles will be added in the fluid, creating a layer of water in supercritical state.
5. After three seconds of the bubbles generation process has run, the uniform collapsing of the bubbles is induced by interposing an equal sign, but of average frequency in the given range. The controlled implosion generates pressure and temperature inside of the bubbles equal or higher to the supercritical water point, generating the desired chemical and physical reactions. In the conventional method bubbles collapse randomly, thus generating the principles before mentioned in a punctual and uncontrolled form.
6. The process is made up to reach between 12 and 15 minutes of controlled generation and collapsing of supercritical bubbles in the same fluid layer to obtain the desired chemical and physical reactions. Given each bubble life takes about 1 second, we need to submit the fluid between 700 and 800 times to the process to generate the desired reactions in the whole body of the fluid.

The invention claimed is:

1. A method of treating a body of water comprising the steps of:
   forming a bubble in the water, wherein the bubble is formed using an ultrasound energy source;
   delaying cavitation of the bubble by varying a frequency of the ultrasound energy source;
   forming additional bubbles in the water using the ultrasound energy source; and
   inducing a simultaneous cavitation of the bubbles, wherein the simultaneous cavitation of the bubbles places the water near the bubbles in a super critical state and the energy created by the simultaneous cavitation of the bubbles desalinizes the body of water.

2. The method of claim 1, wherein the simultaneous cavitation of the bubbles is induced every three seconds.

3. The method of claim 1, wherein the body of water is exposed to the simultaneous cavitation of the bubbles in a super critical state for at least 12 minutes.

* * * * *